(12) United States Patent
Ueda et al.

(10) Patent No.: US 11,758,833 B2
(45) Date of Patent: Sep. 19, 2023

(54) WORK VEHICLE

(71) Applicant: Yanmar Power Technology Co., Ltd., Osaka (JP)

(72) Inventors: Ryohei Ueda, Osaka (JP); Tomoyuki Kuroda, Osaka (JP); Shinsuke Ozaki, Osaka (JP); Kenichi Miyai, Osaka (JP); Kenta Onishi, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 203 days.

(21) Appl. No.: 17/434,001

(22) PCT Filed: Jan. 9, 2020

(86) PCT No.: PCT/JP2020/000427
§ 371 (c)(1),
(2) Date: Aug. 25, 2021

(87) PCT Pub. No.: WO2020/174887
PCT Pub. Date: Sep. 3, 2020

(65) Prior Publication Data
US 2022/0159898 A1 May 26, 2022

(30) Foreign Application Priority Data
Feb. 26, 2019 (JP) ................. 2019-032571

(51) Int. Cl.
*A01B 69/04* (2006.01)
*G01S 19/39* (2010.01)
(Continued)

(52) U.S. Cl.
CPC .............. *A01B 69/008* (2013.01); *B60Q 9/00* (2013.01); *G01S 19/396* (2019.08); *G05D 1/0278* (2013.01)

(58) Field of Classification Search
CPC ....... A01B 69/008; G01S 19/396; B60Q 9/00; G05D 1/0278
See application file for complete search history.

(56) References Cited

U.S. PATENT DOCUMENTS 6,748,320 B2 * 6/2004 Jones ..................... G08G 1/123
455/412.2
8,214,111 B2 * 7/2012 Heiniger .............. A01B 69/008
701/50
(Continued)

OTHER PUBLICATIONS

Jacopo et al., "Aflexible unmanned aerial vehicle for precision agriculture" (Jan. 19, 2012) Springer Science+Business Media, LLC 2012; abstract. (Year: 2012).*

*Primary Examiner* — Gertrude Arthur Jeanglaude
(74) *Attorney, Agent, or Firm* — Chris Mizumoto

(57) ABSTRACT

A work vehicle is presented with which it is possible to prevent an operator from being mislead in cases where the positioning status frequently changes. This work vehicle is provided with: a positioning unit that receives a positioning signal from a satellite positioning system, and measures the work vehicle position on the basis of the positioning signal; a control unit that determines the positioning accuracy on the basis of the positioning status of the positioning unit, and permits autonomous travel when the positioning accuracy is at least a prescribed accuracy; and a notification unit that executes, in accordance with a control performed by the control unit, a first notification indicating that the positioning accuracy is a first accuracy that is at least a prescribed accuracy and a second notification indicating that the positioning accuracy is a second accuracy that is at least a prescribed accuracy. If conditions for transitioning the positioning accuracy from the first accuracy to the second accuracy are satisfied within a first prescribed time since execution of the first notification in accordance with transi- (Continued)

tioning the positioning accuracy to the first accuracy, execution of the first notification is continued until the elapse of a second prescribed time, and after the second prescribed time has elapsed, the first notification is ended and the second notification is executed.

4 Claims, 12 Drawing Sheets

(51) Int. Cl.
    *B60Q 9/00*         (2006.01)
    *G05D 1/02*         (2020.01)

(56) References Cited

U.S. PATENT DOCUMENTS

2017/0135277 A1*   5/2017   Hiramatsu ........... G05D 1/0242
2019/0146513 A1*   5/2019   Tomita ................. B60W 30/10
                                                                                         701/50

* cited by examiner

FIG. 6

| POSITIONING ACCURACY | POSITIONING STATE | AUTONOMOUS TRAVEL | | DISPLAY LAMP |
|---|---|---|---|---|
| | | START | CONTINUE | |
| LEVEL 5 | IN DGPS STATE, LARGER THAN OR EQUAL TO AVERAGE VALUE OF EVALUATION CONDITION | PERMITTED | PROCEED | LIGHTED GREEN |
| LEVEL 4 (FIRST ACCURACY) | IN DGPS STATE, WITHIN RANGE OF EVALUATION CONDITION (FIRST POSITIONING STATE) | PERMITTED | PROCEED | CONTINUOUS BLINKING GREEN (FIRST NOTIFICATION) |
| LEVEL 3 (SECOND ACCURACY) | IN DGPS STATE, OTHER THAN LEVELS 4 AND 5 (SECOND POSITIONING STATE) | PERMITTED | PROCEED | DOUBLE BLINKING GREEN (SECOND NOTIFICATION) |
| LEVEL 2 (THIRD ACCURACY) | WITHIN X SECONDS AFTER TRANSITION TO SGPS STATE (THIRD POSITIONING STATE) | PROHIBITED | PROCEED | BLINKING RED (THIRD NOTIFICATION) |
| LEVEL 1 (FOURTH ACCURACY) | CONTINUE FOR MORE THAN X SECONDS AFTER TRANSITION TO SGPS STATE, OR STATE OTHER THAN LEVELS 2 TO 5 | PROHIBITED | INTERRUPTED | LIGHTED RED (FOURTH NOTIFICATION) |

WORK VEHICLE

CROSS-REFERENCE

This application is a US National Stage Application under 35 U.S.C. § 371 of International Application No. PCT/JP2020/000427 filed Jan. 9, 2020, which claims foreign priority of JP2019-032571 filed Feb. 26, 2019 the disclosures of which are hereby incorporated by reference in their entirety.

TECHNICAL FIELD

The present invention relates to a work vehicle that uses a satellite positioning system to autonomously travel.

BACKGROUND ART

Conventionally, there has been known a work vehicle that uses a satellite positioning system to autonomously travel within a field. Since, in autonomous travel, it is necessary to specify the position of the work vehicle with high accuracy, the autonomous travel should be stopped when the positioning status deteriorates due to the number of satellites communicating, communication failure (for example, the presence of obstacles), or the like. Since the positioning state is one of the criteria for determining whether or not the autonomous travel can be continued, it is useful to notify the operator of the positioning state, as described in Patent Literature 1. However, since the positioning state changes frequently depending on the situation, if the notification is changed frequently in accordance with the situation, there is a risk of giving a misleading impression that the current positioning state is unstable.

CITATION LIST

Patent Literature

Patent Literature 1: Japanese Unexamined Utility Model Application Publication No. 63-067887

DISCLOSURE OF INVENTION

Problems to be Solved by the Invention

An object of the present invention, which has been made in view of the above problems, is to provide a work vehicle that prevents the operator from receiving a misleading impression when the positioning state changes frequently.

Means for Solving the Problems

A work vehicle according to the present invention autonomously travels while specifying the position of the work vehicle by using a satellite positioning system, the work vehicle including a positioning portion that receives a positioning signal from the satellite positioning system and measures the position of the work vehicle based on the positioning signal; a control unit that determines a positioning accuracy based on a positioning state of the positioning portion, and permits the autonomous travel when the positioning accuracy is higher than or equal to predetermined accuracy; and a notification unit that executes a first notification and a second notification in response to control by the control unit, the first notification indicating that the positioning accuracy is a first accuracy higher than or equal to the predetermined accuracy, the second notification indicating that the positioning accuracy is a second accuracy higher than or equal to the predetermined accuracy, wherein when a condition for transitioning the positioning accuracy from the first accuracy to the second accuracy is satisfied within a first predetermined time after the first notification is executed in response to a transition to the first accuracy, the first notification is continuously executed for a second predetermined time, and the first notification is ended and the second notification is executed after the second predetermined time elapses.

There is no problem in continuing the autonomous travel even if the positioning state is continuously changed, so long as a positioning accuracy (first or second accuracy) in which autonomous travel is permitted continues. Therefore, in this work vehicle, when the positioning state is continuously changed within the first predetermined time as described above, the notification is not changed immediately but is changed after the second predetermined time has elapsed. This can prevent the operator from misinterpreting the notification when the positioning state changes frequently.

It is preferred that the control unit permits continuation of the autonomous travel while prohibiting start of the autonomous travel when the positioning accuracy is a third accuracy lower than the first accuracy and the second accuracy, the notification unit executes a third notification indicating that the positioning accuracy is the third accuracy in response to control by the control unit, and when a condition for transitioning the positioning accuracy from the second accuracy to the third accuracy is satisfied within a third predetermined time after executing the second notification in response to the transition to the second accuracy, the second notification is continuously executed for a fourth predetermined time, and the second notification is ended and the third notification is executed after the fourth predetermined time elapses. Since the handling of the notification for a positioning accuracy (third accuracy) that permits the start of automatic driving but does not permit the continuation (proceeding) of automatic driving is the same for that of a higher positioning accuracy (first and second accuracy), the operator can be more effectively prevented from misinterpreting the notification.

It is preferred that the control unit prohibits the start and the continuation of the autonomous travel when the positioning accuracy is a fourth accuracy lower than the first accuracy and the second accuracy, the notification unit executes a fourth notification indicating that the positioning accuracy is the fourth accuracy in response to control by the control unit, and when a condition for transitioning the positioning accuracy to the fourth accuracy is satisfied, the fourth notification is immediately executed. By immediately changing the notification for a positioning accuracy (fourth accuracy) that prohibits the start and the continuation of the autonomous travel, the operator can be informed without delay that the cause of the end of the autonomous travel was deterioration of the positioning state.

It is preferred to include a steering handle disposed in front of a driver's seat; an indicator that instructs start of the autonomous travel; an operation member including a display of the notification unit; and an arm member that supports the operation member, wherein the operation member supported by the arm member is movable within a range from a front edge to a rear edge of the steering handle in a plan view but is not movable behind the rear edge of the steering handle in a plan view. Since the operation member can move within the above range, it is convenient for the operator to instruct the start of the autonomous travel and confirm the positioning accuracy. Since the operation member cannot be moved behind the rear edge of the steering handle, it is possible to prevent the operation member from deteriorating visibility.

BRIEF DESCRIPTION OF DRAWINGS

FIG. 6 is a table showing an example relationship between positioning accuracy, autonomous travel, and notifications.

DESCRIPTION OF EMBODIMENTS

Figure 1:
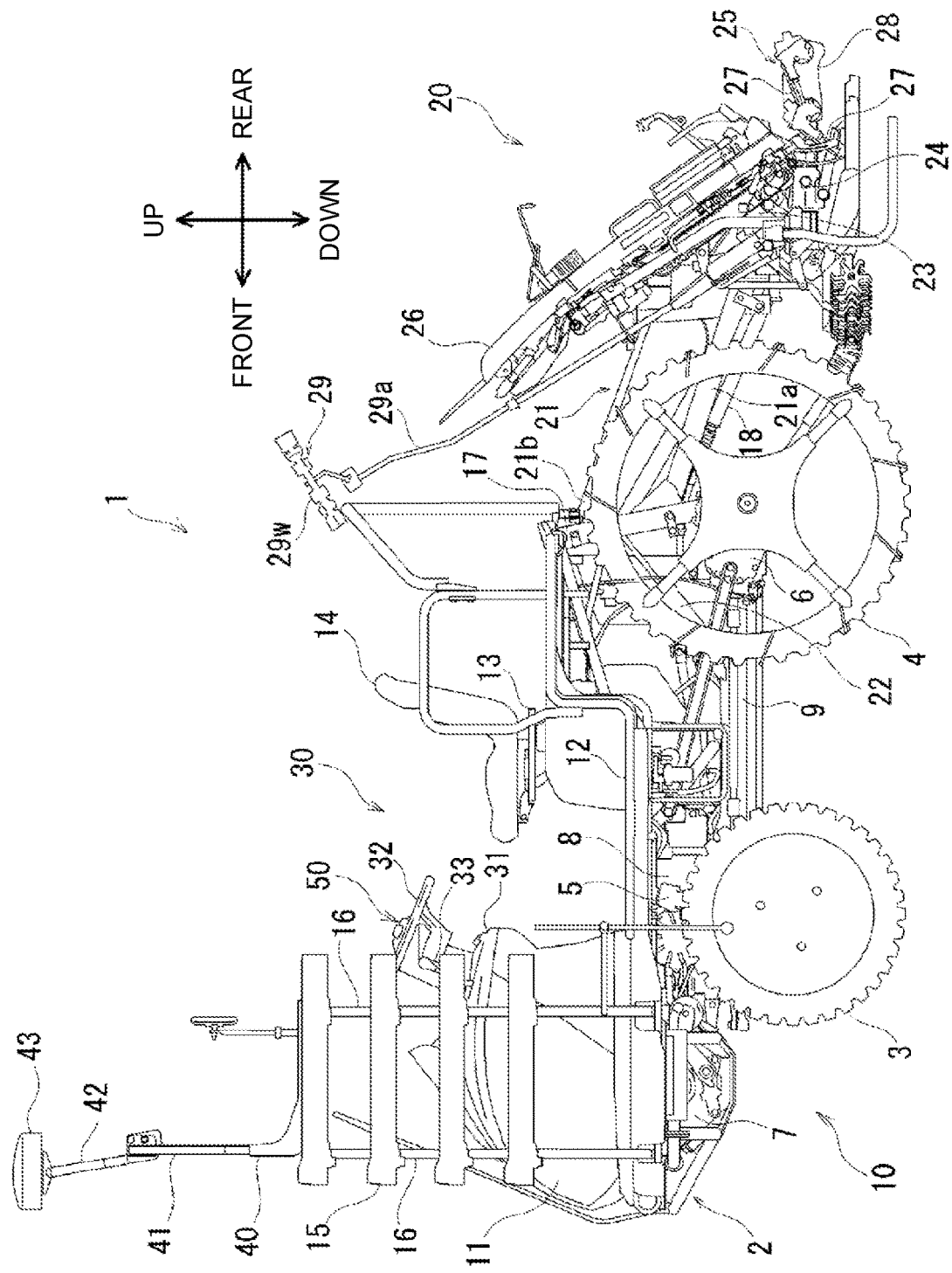
FIG. 1 is a left side view of a rice transplanter, which is one example of a work vehicle according to the present invention.

Embodiments of the present invention will be described with reference to the drawings. In the present embodiment, a rice transplanter 1 illustrated in FIG. 1 is described as an example of a passenger-type work vehicle. However, the work vehicle according to the present invention is not limited to a rice transplanter, and may be, for example, an agricultural work vehicle, such as a tractor, a combine harvester, or a seedling transplanter. Alternatively, the work vehicle may be a civil engineering work vehicle, a snow-plow, etc.

Overall Structure of Rice Transplanter

The overall structure of the rice transplanter 1 will now be briefly described. In FIG. 1, the front-back direction and the up-down direction of the rice transplanter 1 are indicated by arrows, and the direction perpendicular to the surface of the page is the left-right direction. The rice transplanter 1 includes a traveling portion 10 and a planting portion 20 serving as a working portion. The planting portion 20 is disposed behind the traveling portion 10. The planting portion 20 is coupled to the rear part of the traveling portion 10 via an elevating mechanism 21 so as to be movable up and down. The rice transplanter 1 is able to perform seedling planting (rice transplanting) work for planting seedlings by the planting portion 20 while traveling in the field by the traveling portion 10.

The traveling portion 10 includes a traveling machine body 2, a pair of left and right front wheels 3 that support the traveling machine body 2, and a pair of left and right rear wheels 4. The front wheels 3 are attached to front axles extending from a front axle case 5 to both the left and right sides. The front axle case 5 is disposed a side of a transmission case 8, and is supported by the front portion of the traveling machine body 2. The rear wheels 4 are attached to the rear axles extending from a rear axle case 6 to both the left and right sides. The rear axle case 6 is disposed at the rear end portion of a tubular frame 9 projecting rearward from the transmission case 8, and is supported by the rear portion of the traveling machine body 2.

An engine 7, which is a drive source, is mounted on the front portion of the traveling machine body 2. The engine 7 is covered by a bonnet 11. The power of the engine 7 is transmitted to the transmission case 8 disposed behind the engine 7, and is transmitted to the front wheels 3 and the rear wheels 4 via the transmission case 8. By transmitting power to the front wheels 3 and the rear wheels 4 to rotate the wheels, the traveling portion 10 can travel in the front-rear direction.

A link frame 17 is erected at the rear end portion of the traveling machine body 2. The planting portion 20 is coupled to the link frame 17 via the elevating mechanism 21 so as to be movable up and down. The elevating mechanism 21 includes a lower link 21a and a top link 21b. The distal end portion of a rod of a hydraulic elevating cylinder 22 is coupled to the lower link 21a. A cylinder proximal end portion of the elevating cylinder 22 is supported by the rear portion of the upper surface of the tubular frame 9 so as to be vertically rotatable. By extending and retracting the elevating cylinder 22, the elevating mechanism 21 turns in the vertical direction, and the planting portion 20 moves up and down.

The planting portion 20 includes a planting input case 23 to which the power from the engine 7 is transmitted via the transmission case 8 and a PTO shaft (power transmission shaft) 18; multiple planting transmission cases 24 coupled to the planting input case 23; a seedling planting mechanism 25 disposed on the rear end side of each planting transmission case 24; and a seedling stand 26 on which a seedling mat is placed. The spare seedlings to be used for seedling reloading (seedling supply) to the planting portion 20 are placed on spare seedling stands 15 disposed on both the left and right sides of the bonnet 11. The spare seedling stands 15 are supported by support frames 16 (spare seedling struts) erected on both the left and right sides of the front portion of the traveling machine body 2.

The seedling planting mechanism 25 is provided with a rotary case 28 having two planting claws 27 and 27 for each row of planting. As the rotary case 28 rotates, the two planting claws 27 and 27 alternately pick up seedlings from seedling mats and plant them in the field. Since the rice transplanter 1 of the present embodiment is a rice transplanter for eight-row planting, it is provided with four planting transmission cases 24 for the eight-row planting (each for two-row planting), and the seedling stand 26 is also for eight-row planting. However, the rice transplanter 1 is not limited thereto, and may be, for example, a rice transplanter for six-row planting or ten-row planting.

Side markers 29 are disposed on the left and right outer sides of the planting portion 20. The side markers 29 each have a marker ring body 29w for line drawing and a marker arm 29a that rotatably supports the marker ring body 29w. The proximal end portions of the marker arms 29a are supported on the left-right outer sides of the planting portion 20 so as to be rotatable in the left-right direction. The side markers 29 are each shiftable between a landing posture in which the marker ring body 29w is lowered to form a reference trajectory on the rice field surface in the next process, and a non-landing posture in which the marker ring body 29w is raised and separated from the rice field surface (see FIG. 1).

A driving operation portion 30 is disposed at the center portion along the front-rear direction of the traveling machine body 2. The operator rides on a work step 12 (body cover) disposed on the upper surface side of the traveling machine body 2 and operates the rice transplanter 1 in the driving operation portion 30. An operation panel 31 is disposed on the front portion of the driving operation portion 30. The operation panel 31 is disposed on the upper surface side of the rear portion of the bonnet 11. Multiple operating tools including a steering handle 32 and a main speed change lever 33 are disposed on the operation panel 31. A driver's seat 14 is disposed behind the operation panel 31 via a seat frame 13.

Multiple spare seedling stands 15 (four in the present embodiment) are supported on each of the left and right sides of the bonnet 11 by two support frames 16 and 16 disposed apart from each other in the front-rear direction. Coupling frames 40, each having a substantially L-shape in a lateral view, are coupled to the upper ends of the two support frames 16 and 16. A unit frame 42 is connected to the upper ends of the coupling frames 40 via intermediate frames 41 extending in the vertical direction. The unit frame 42 is rotatably coupled to the upper portions of the left and right intermediate frames 41. A positioning unit 43 serving as a positioning portion is fixed to the unit frame 42.

The positioning unit 43 receives a positioning signal from a satellite positioning system (GNSS) and specifies the position of the rice transplanter 1 on the basis of the positioning signal. The rice transplanter 1 autonomously travels while specifying the position of itself by using a satellite positioning system. The rice transplanter 1 generates a linear reference route (teaching route) that serves as a reference for straight travel and thereby can autonomously travel straight on a target route generated in parallel with the reference route. A straight-travel assisting work by autonomous travel requires registration of a start point of the reference route referred to as point A, registration of an end point of the reference route referred to as point B, and on/off (start/stop) operation of autonomous travel. Note that, in addition to the straight travel, the work vehicle may autonomously travel a turning route connecting target routes.

The present embodiment describes an example in which a DGPS (differential GPS), which is an example of a DGNSS (differential GNSS), is used as a satellite positioning system. Besides the DGPS, other satellite positioning systems, such as an RTK (real-time kinematic) and an SBAS (geostationary satellite navigation augmentation system), may be used.

Driving Operation Portion

Figure 2:
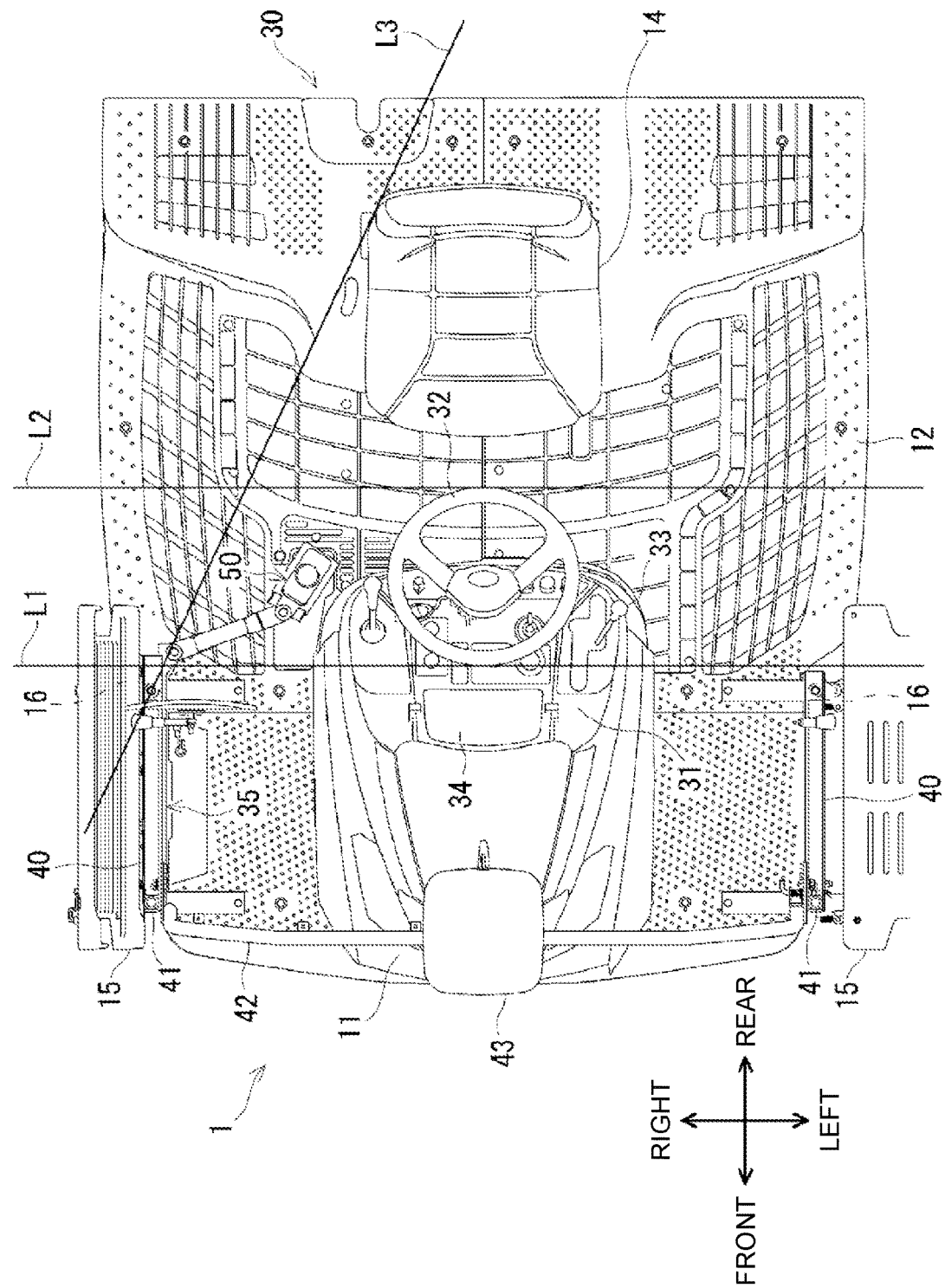
FIG. 2 is a plan view of a portion of the rice transplanter.
Figure 3:
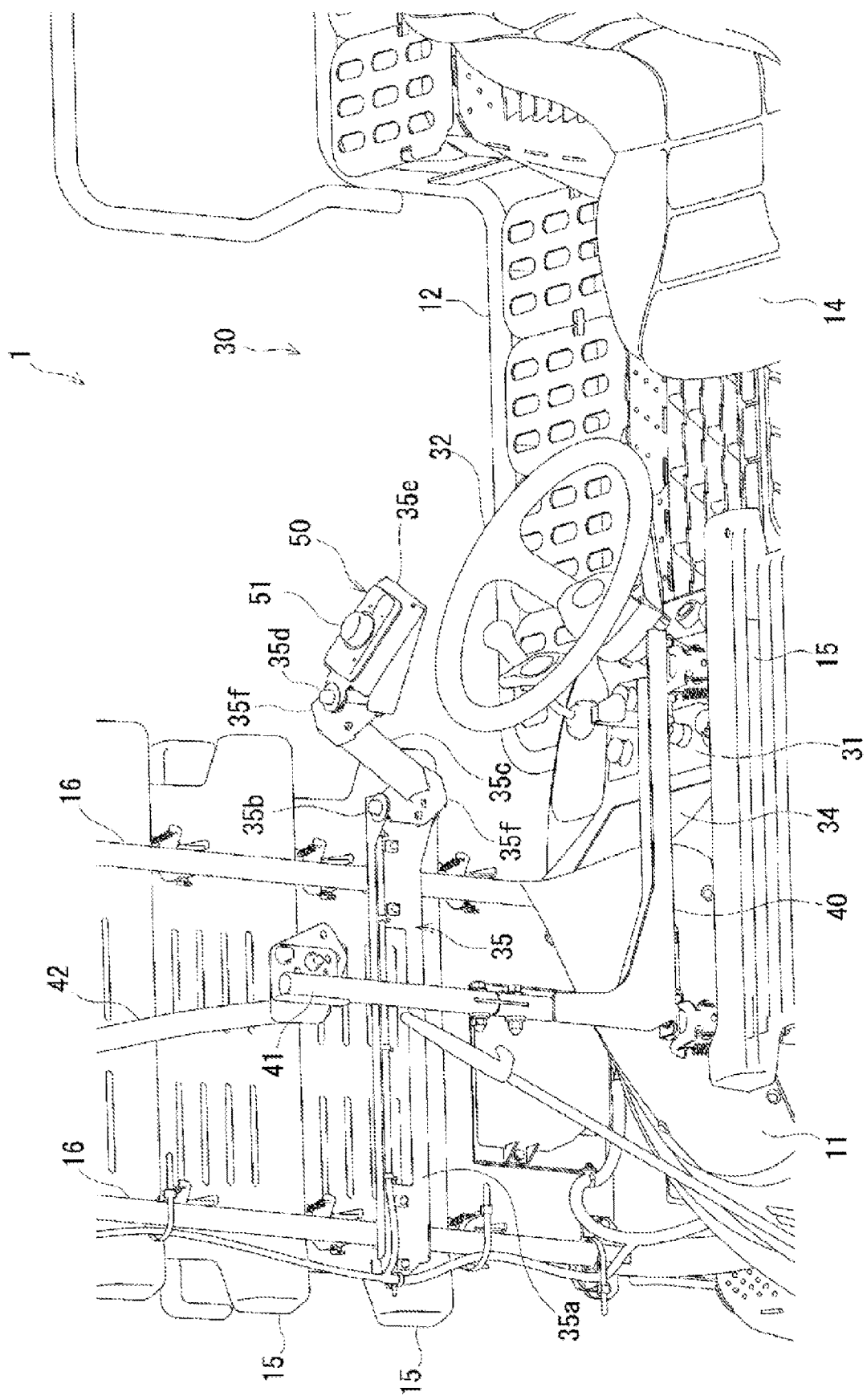
FIG. 3 is a perspective view of a driving operation portion as viewed from the front left.

The driving operation portion 30 will now be described. As illustrated in FIGS. 2 and 3, various operating tools and a display device 34 are disposed on the operation panel 31, in addition to the steering handle 32 and the main speed change lever 33. The steering handle 32 is disposed in front of the driver's seat 14. A speed change pedal and a brake pedal (not illustrated) are disposed below the operation panel 31. The speed change pedal is an operating tool for changing the vehicle speed of the rice transplanter 1. The brake pedal is an operating tool for braking the rice transplanter 1. In general, the speed change pedal is disposed on the lower right of the operation panel 31, and the brake pedal is disposed on the left of the transmission pedal.

The rice transplanter 1 includes an operation member 50 for performing an operation related to autonomous travel, and an arm member 35 for supporting the operation member 50. The operation member 50 is fixed to the corresponding support frames 16 and 16 of the spare seedling stand 15 via the arm member 35. In this way, the operation member 50 can be firmly supported. The operation member 50 is disposed on the outer side of the operation panel 31 in the width direction of the machine body. Although the operation member 50 is disposed on the right side of the driving operation portion 12, it alternatively may be disposed on the left side. However, by disposing the operation member 50 on the same side as the speed change pedal (usually on the right side), it becomes easier to press the AUTO button 51 of the operation member 50, which will be described later, at the same timing as accelerating when starting the straight travel work, and thereby operability is enhanced.

The arm member 35 includes a stay-shaped upper arm portion 35a fixed to the corresponding support frames 16 and 16; a forearm portion 35c that turns relative to the upper arm portion 35a in the horizontal direction with a hinge 35b serving as the fulcrum; and a holder 35e that turns relative to the forearm portion 35c in the horizontal direction with the hinge 35d serving as the fulcrum. The operation member 50 is attached to the holder 35e. Elbow portions 35f and 35f bent in the vertical direction are formed at the two ends of the forearm portion 35c. The elbow portions 35f may be turnable in the vertical direction via hinges. By turning the forearm portion 35c in the horizontal direction and bringing it closer to the upper arm portion 35a, the arm member 35 can be compactly stored, and a passage width can be secured in front of the spare seedling stand 15. The operation member 50 held by the holder 35e can be moved within the movable range of the arm member 35.

It is preferred that the operation member 50 supported by the arm member 35 be able to move within the range from the front edge to the rear edge of the steering handle 32 in a plan view (that is, within the range between the virtual straight line L1 and the virtual straight line L2 illustrated in FIG. 2). In the vertical direction, it is preferred that the operation member 50 be able to move within a height range from the upper edge to the lower edge of the steering handle 32. Furthermore, from the viewpoint of preventing deterioration of visibility, it is preferred that the operation member 50 not be able to move behind the rear edge of the steering handle 32 (that is, behind the virtual straight line L2) in a plan view. The operation member 50 is disposed in front of the virtual straight line L3 connecting the support frame 16 on the rear side and the outer edge of the backrest of the driver's seat 14. In this way, the operation member 50 does not get in the way during seedling reloading.

Figure 4:
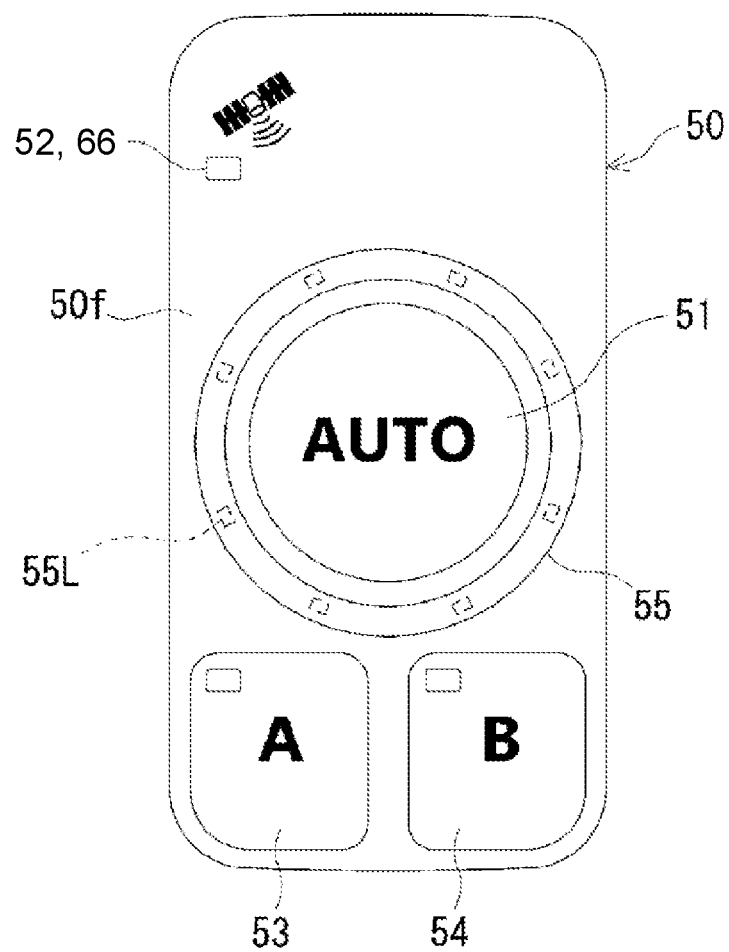
FIG. 4 is a diagram illustrating an operation face of an operation member.

In the present embodiment, as illustrated in FIG. 4, the operation member 50 has an AUTO button 51 that is an indicator for instructing the start of autonomous travel, and a display lamp 52 serving as a display of a notification unit 66 described later. Furthermore, the operation member 50 has an A button 53 that is an indicator for registration operation of a point A, and a B button 54 that is an indicator for registration operation of a B point. The AUTO button 51 is disposed in the central portion of the operation face 50f of the operation member 50, and the display lamp 52 is disposed at the upper left of the AUTO button 51. The A button 53 and the B button 54 are disposed side by side below the AUTO button 51.

The AUTO button 51 is operated to start and stop autonomous travel. Since the AUTO button 51 is operated more frequently than the A button 53 and the B button 54, it is larger than the A button 53 and the B button 54 in a front view so that the pressing operation can be facilitated. The AUTO button 51 protrudes more than the A button 53 and the B button 54. The A button 53 and the B button 54 are have the same shape, and are arranged symmetrically. An annular light emitting part 55 is disposed around the AUTO button 51. As will be described later, the light emitting part 55 has a function of notifying the operator of various states related to autonomous travel through its light colors and lighting patterns.

The display lamp 52 displays, in a stepwise manner, the positioning accuracy corresponding to the positioning state of the positioning unit 43 by displaying light, more specifically, by using multiple types (two types in the present embodiment) of light colors and lighting patterns. The positioning state serves as a criterion for determining whether or not autonomous travel can be started or continued. Since the display lamp 52 is provided on the operation member 50 having the AUTO button 51, the operator can instruct the start of autonomous travel while confirming whether or not autonomous travel is allowed. Since the operation member 50 is provided independently from the operation panel 31, conveniently, there is no need to modify the operation panel when an autonomous travel system is to be added on an existing rice transplanter.

Configuration Related to Autonomous Travel

Figure 5:
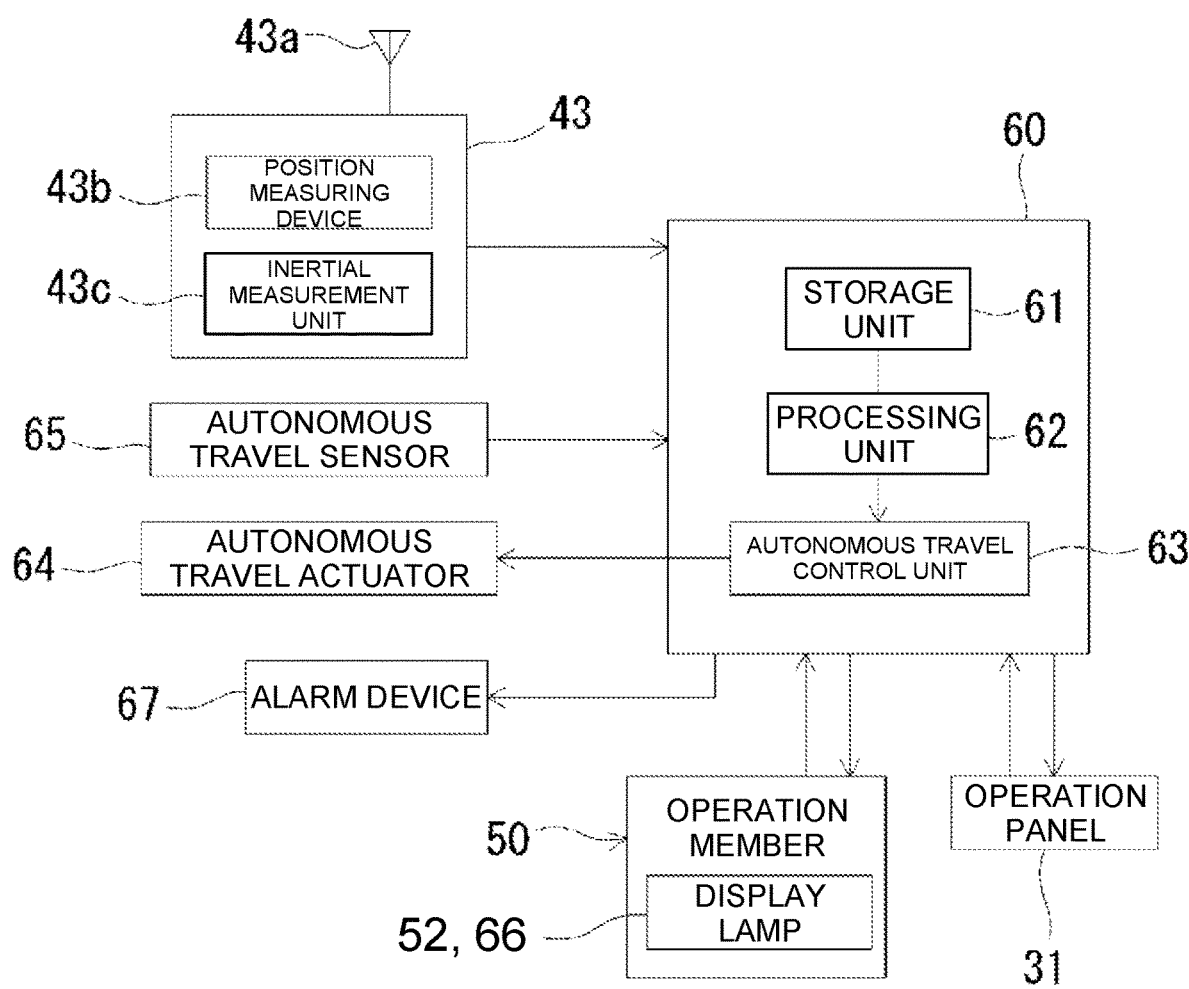
FIG. 5 is a block diagram illustrating the main configuration related to autonomous travel.

FIG. 5 is a block diagram illustrating the main configuration related to autonomous travel. The positioning unit 43 includes a positioning antenna 43a, a position measuring device 43b, and an inertial measurement unit (IMU) 43c. The positioning antenna 43a receives a signal from a positioning satellite (a GPS satellite in the present embodiment) of a satellite positioning system. The positioning signal received by the positioning antenna 43a is input to the position measuring device 43b. The position measuring device 43b measures the position of the work vehicle by processing the input positioning signal. The inertial measurement unit 43c specifies the posture (roll angle, pitch angle, and yaw angle) of the traveling machine body 2.

The rice transplanter 1 includes a control unit 60 for controlling the operation (forward, reverse, stop, turn, etc.) of the traveling machine body 2 and the operation (up-down movement, drive, stop, etc.) of the planting portion 20, which is a working portion. The control unit 60 includes a CPU, a ROM, a RAM, an I/O, and the like (not illustrated). The CPU can read various programs and the like from the ROM and execute them. The ROM stores operation programs, application programs, and various types of data. Through the cooperation of such hardware and software, the control unit 60 can be operated as a storage unit 61, a processing unit 62, an autonomous travel control unit 63, etc.

The storage unit 61 stores various types of information necessary for the autonomous travel of the rice transplanter 1. Examples of such information include the horizontal distance from the positioning antenna 43a to the seedling planting mechanism 25, and the positions of points A and B registered and set by the operator. The processing unit 62 performs various types of processing necessary for the autonomous travel of the rice transplanter 1. Examples of such processing include determination of positioning accuracy based on the positioning state of the positioning unit 43, and determination of permission/rejection of autonomous travel based on the determination result. The autonomous travel control unit 63 performs control related to autonomous travel.

The autonomous travel control unit 63 controls an autonomous travel actuator 64 so that the rice transplanter 1 travels along the traveling route on the basis of the information on the position of the work vehicle measured by the positioning unit 43. The autonomous travel actuator 64 refers to various actuators that are operated during autonomous travel, such as an actuator that steers the steering handle 32, an actuator that shifts the transmission in the transmission case 8, and an actuator (the elevating cylinder 22) that raises and lowers the planting portion 20. The autonomous travel control unit 63 controls the operation of the rice transplanter 1 on the basis of the signals from an autonomous travel sensor 65 provided in the rice transplanter 1.

The control unit 60 determines the positioning accuracy on the basis of the positioning state of the positioning unit 43, and permits autonomous travel when the positioning accuracy is higher than or equal to a predetermined accuracy. The positioning state of the positioning unit 43 changes fluidly due to the number of usable GNSS satellites having a signal strength higher than or equal to a predetermined level, the HDOP (accuracy reduction rate for position determination in a horizontal plane), the GPS age, and the like. FIG. 6 illustrates the determination conditions for positioning accuracy based on the positioning state, and the autonomous travel and the type of notification corresponding to the determined positioning accuracy. Under such determination conditions, if the DGPS is in a valid state (DGPS state), the positioning accuracy is determined to be level 5, 4, or 3. If the DGPS is invalid, and the state is an SGPS (single GPS as a single GNSS, single positioning) (SGPS state), the positioning accuracy is determined to be level 2 or 1.

Level 5 corresponds to a positioning state in which the value is higher than or equal to the average value of a predetermined evaluation condition. For example, the evaluation condition is, for example, a condition in which a certain accuracy is guaranteed by the manufacturer of the positioning unit 43. Level 4 corresponds to a positioning state (first positioning state) that does not satisfy the condition of level 5 but is within the range of the evaluation condition. Level 3 corresponds to a positioning state (second positioning state) that is the DGPS state and does not satisfy the conditions of levels 4 and 5. At any one of levels 5 to 3, the start of autonomous travel is permitted and the continuation of autonomous travel is also permitted (that is, automatic travel is not interrupted). In the present embodiment, the positioning accuracy is determined in five levels, but the levels are not limited thereto, and, for example, level 5 may be integrated into level 4 to have four levels.

Level 2 corresponds to a state (third positioning state) in which the duration of the SGPS state is X seconds or less after the transition from the DGPS state to the SGPS state. The control unit 60 is able to set an arbitrary number of seconds to X seconds. Level 1 corresponds to a state in which the SGPS state is continued for more than X seconds after the transition from the DGPS state to the SGPS state, or a state other than levels 2 to 5. At level 2, the start of autonomous travel is prohibited, but the continuation of autonomous travel is permitted. The reason why the continuation of autonomous travel is permitted at level 2 is that stable autonomous travel can be maintained even if the autonomous travel is continued when the DGPS state is restored in a relatively short time even if the positioning accuracy deteriorates. At level 1, the start and continuation of autonomous travel are prohibited, and even if the AUTO button 51 is pressed, autonomous travel is not executed.

As illustrated in FIGS. 5 and 6, the rice transplanter 1 includes a notification unit 66, and the notification unit 66 executes a first notification and a second notification in response to the control by the control unit 60, the first notification indicating that the positioning accuracy is level 4 corresponding to a first accuracy in which the positioning accuracy is higher than or equal to a predetermined accuracy, the second notification indicating that the positioning accuracy is level 3 corresponding to a second accuracy in which the positioning accuracy is higher than or equal to the predetermined accuracy. Moreover, the notification unit 66 executes a third notification, a fourth notification, and another notification in response to the control by the control unit 60, the third notification indicating that the positioning accuracy is level 2 corresponding to a third accuracy, the fourth notification indicating that the positioning accuracy is level 1 corresponding to a fourth accuracy, the other accuracy indicating that the positioning accuracy is level 5. The third accuracy and the fourth accuracy are lower than the first accuracy and the second accuracy, respectively, and the fourth accuracy is lower than the third accuracy. The notification unit 66 includes the display lamp 52 provided on the operation member 50.

The display lamp 52 issues a notification by light color and lighting pattern. The first notification is "continuous blinking green" in which the display lamp 52 blinks in green at a predetermined cycle (for example, a one-second cycle). The second notification is "double blinking green" in which the display lamp 52 blinks twice in green during a predetermined unit time (for example, one second), then turns off for the predetermined unit time, and alternates the blinking and the turning off. The third notification is "blinking red" in which the display lamp 52 blinks in red at a predetermined cycle (for example, a one-second cycle). The fourth notification is "lighted red" in which the display lamp 52 is continuously lighted in red. The fifth notification is "lighted green" in which the display lamp 52 is continuously lighted in green. The mode of notification executed by the notification unit 66 is not limited thereto, and for example, yellow may be used as the light color of the display lamp 52.

The rice transplanter 1 of the present embodiment includes an alarm device 67 that sounds an alarm in response to the control by the control unit 60. The control unit 60 controls the alarm device 67 so that the alarm is intermittently sounded at a predetermined cycle (for example, a one-second cycle) when the display lamp 52 executes the third notification. The control unit 60 controls the alarm device 67 so that the alarm is continuously sounded when the display lamp 52 executes the fourth notification. A notification can be issued by using light and sound when the positioning state is in the SGPS state so as to alert the operator. In place of or in addition to the rhythm of the alarm sound, the loudness, pitch, timbre, etc., of the alarm sound may be changed. The alarm device 67 may be provided on the operation member 50.

Figure 7A:
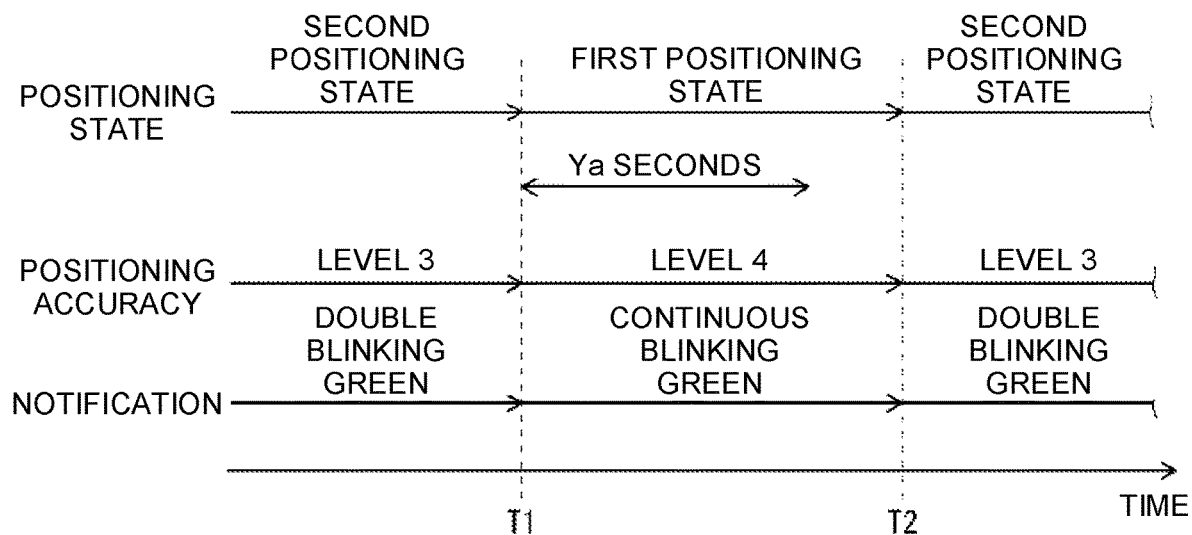
FIG. 7A is a diagram illustrating the timing of changing notifications.

As illustrated in FIG. 7A, while the positioning state is the second positioning state, the control unit 60 determines the positioning accuracy to be level 3, and controls the display lamp 52 to execute the second notification "double blinking green". In this way, the operator is informed that the current positioning state is the DGPS state and autonomous travel can be started and continued. When the positioning accuracy is changed from the second positioning state to the first positioning state, the control unit 60 causes a transition of the positioning accuracy from level 3 to level 4 at time T1, and controls the display lamp 52 to immediately execute the first notification "continuous blinking green". Similarly, when the positioning accuracy is changed from the first positioning state to the second positioning state, the positioning accuracy transition from level 4 to level 3 at time T2, and the display lamp 52 is caused to execute "double blinking green". In this way, the operator can be informed of a change in the positioning state.

Since the positioning state of the positioning unit 43 changes fluidly depending on the situation, if the notification is changed frequently following the situation, there is a risk of giving a misleading impression that the current positioning state is unstable to the operator or a risk of misinterpretation by the operator. For example, if the positioning state of the positioning unit 43 is changed from the second positioning state to the first positioning state and then immediately to the second positioning state, the notification will be changed from "double blinking green" to "continuous blinking green" and then immediately to "double blinking green". This may lead to such misinterpretation. In particular, since the "continuous blinking green" and the "double blinking green" have the same light color and differ only in the lighting pattern (blinking rhythm), there is a great concern about such misinterpretation.

Figure 7B:
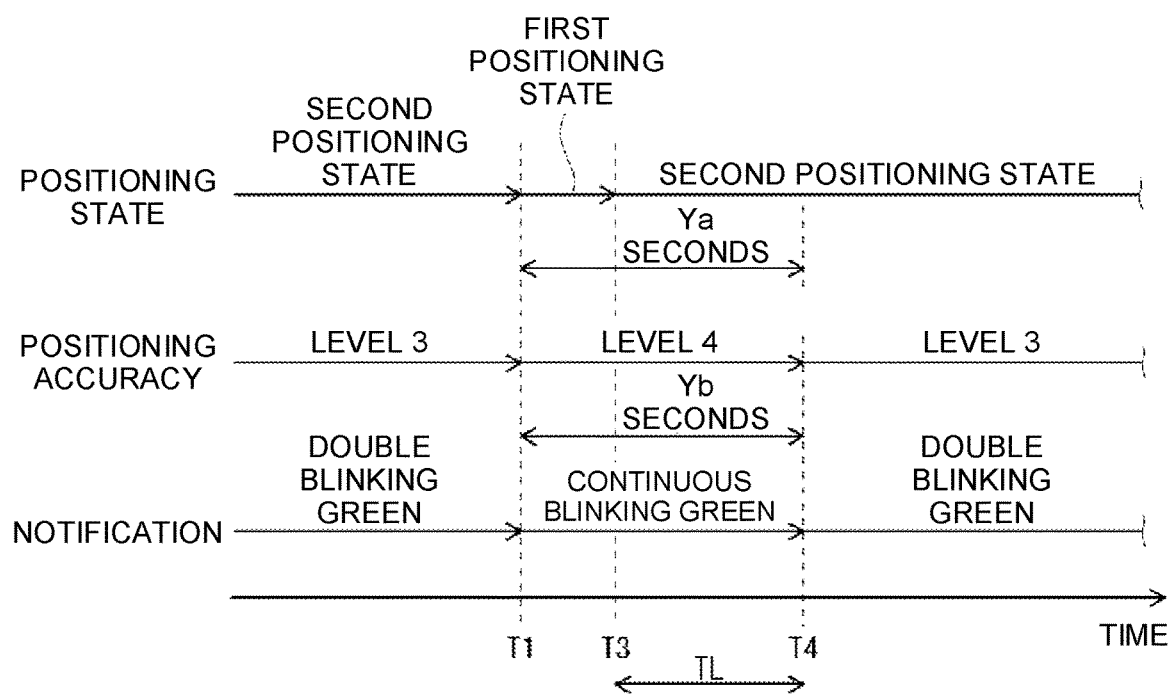
FIG. 7B is a diagram illustrating the timing of changing notifications.

Accordingly, as illustrated in FIG. 7B, when the rice transplanter 1 satisfies the condition for transitioning the positioning accuracy from the first accuracy to the second accuracy (level 3) within a first predetermined time after the "continuous blinking green" (first notification) is executed in response to the transition to the first accuracy (level 4), specifically, within Ya seconds from time T1, i.e., when the positioning state is changed from the first positioning state to the second positioning state, the "continuous blinking green" is continuously executed for Yb seconds, which corresponds to a second predetermined time, the "continuous blinking green" is ended after Yb seconds elapse, and the "double blinking green" (second notification) is executed. In such a case, a time lag TL occurs between the time T3 at which the positioning state is changed and the time T4 at which the notification is changed. However, since the first accuracy and the second accuracy are both higher than or equal to the predetermined accuracy at which autonomous travel is permitted, there is no problem in continuing the autonomous travel even if the positioning state is continuously changed, so long as the first or second accuracy continues.

In the present embodiment, level 4 is defined as the first accuracy, and level 3 is defined as the second accuracy. However, since the first accuracy and the second accuracy may be any positioning accuracy that permits autonomous travel, for example, levels 3 and level 4 may be defined as the first accuracy and the second accuracy, respectively, or levels 5 and level 4 may be defined as the first accuracy and the second accuracy, respectively. Even in such a case, it is possible to execute a notification in the mode in FIG. 7B.

In the example illustrated in FIG. 7B, in a situation in which the positioning state is changed from the first positioning state to the second positioning state within Ya seconds after the positioning state is changed from the second positioning state to the first positioning state, level transition (transition of positioning accuracy) is not performed until Yb seconds elapse, and then the level transitions after Yb seconds. This is because the control unit 60 does not determine the positioning accuracy within Yb seconds from time T1 at which the level transitions, except for the determination targeting level 1. In other words, there is provided a transition prohibition time (a second predetermined time of Yb seconds) for prohibiting a transition to a positioning accuracy other than level 1 after the level transitions. In the present embodiment, Yb seconds are counted from the same time T1 for Ya seconds.

Figure 7C:
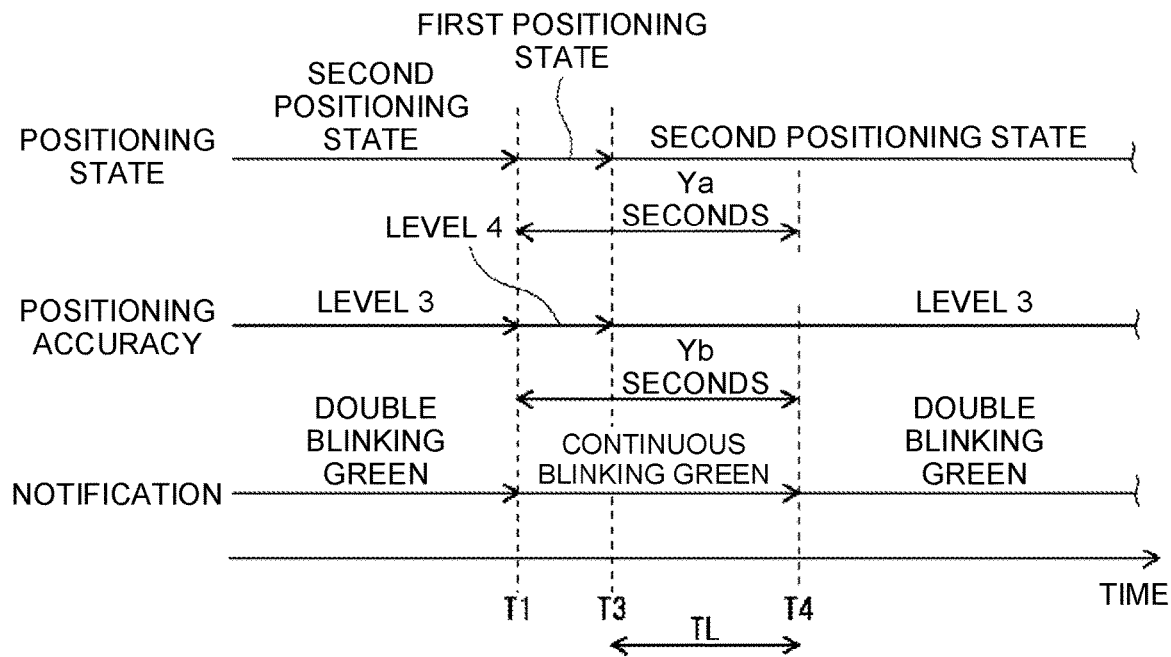
FIG. 7C is a diagram illustrating a modified example of the timing of changing notifications.
Figure 7D:
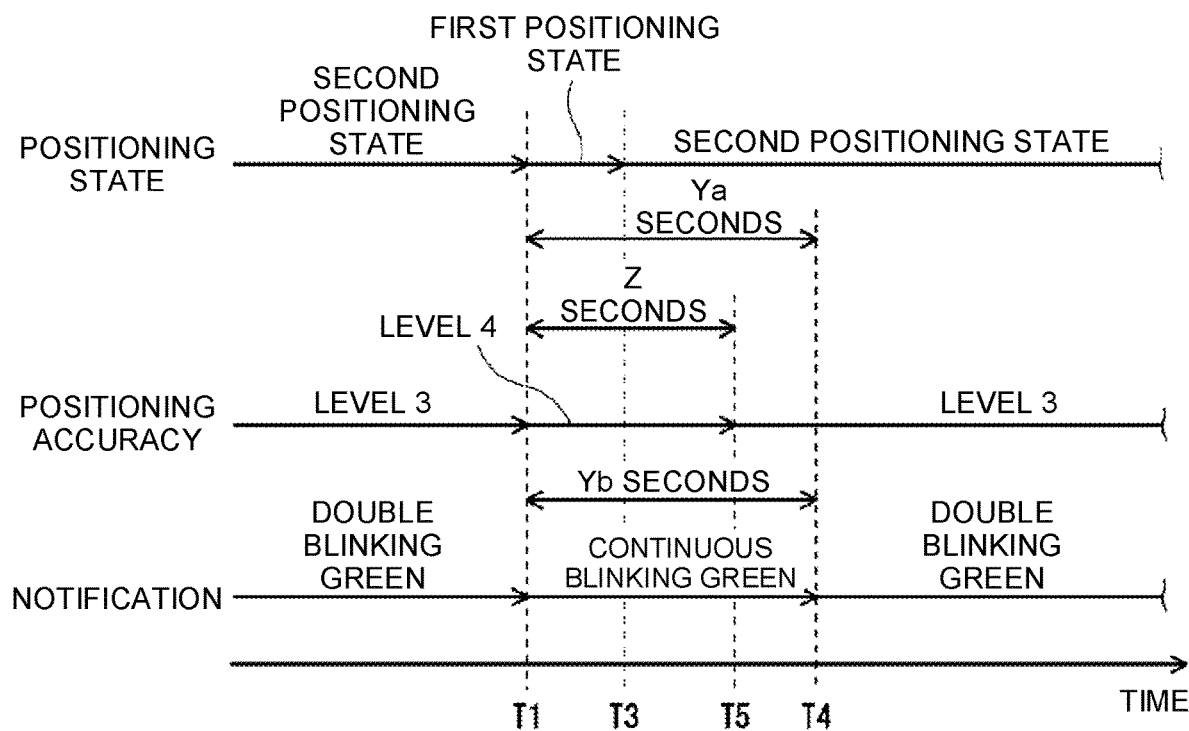
FIG. 7D is a diagram illustrating a modified example of the timing of changing notifications.

As described above, in the present embodiment, when the positioning state fluctuates in small intervals, the immediate transition of the positioning accuracy is prohibited, and, in response, the notification is prevented from being immediately changed. However, the present invention is not limited thereto, and as in the modified example of FIG. 7C, when the positioning state is continuously changed within Ya seconds, the positioning accuracy may immediately transition time T3 at which the positioning state has been changed. Alternatively, as in the modified example of FIG. 7D, a time (Z seconds) that is different from the second predetermined time (Yb seconds) serving as the reference for changing the notification may be set, and the positioning accuracy may transition at time T5 corresponding to the elapsing of Z seconds. In any case, the control unit 60 controls the display lamp 52 so as to end the "continuous blinking green" after the second predetermined time (transition prohibition time) elapses and to execute the "double blinking green". However, from the viewpoint of matching the positioning accuracy and the type of notification, it is desirable to perform control in the mode of FIG. 7B rather than the modes of FIGS. 7C and 7D.

The lengths of the first and second predetermined times are not particularly limited. The control unit 60 can set Ya seconds and Yb seconds to be any length of time. From the viewpoint of enhancing the visibility of the display lamp 52, it is preferred that Yb seconds be the same as or longer than the blinking cycle of the display lamp 52. Moreover, it is preferred that Yb seconds be the same as or less than the above X seconds (that is, X≥Yb). In this way, in the case of control in the mode of FIG. 7C, even if the positioning state is changed from the second positioning state to the third positioning state within Ya seconds from time T1 at which the level transitions, the positioning accuracy does not transition to level 1 within Yb seconds (that is, X seconds elapses). Therefore, it is possible to prevent the display lamp 52 from being lighted in green in a situation where autonomous travel is prohibited. X seconds is set to, for example, 10 seconds, and Yb seconds are set to, for example, 2 seconds.

Figure 7E:
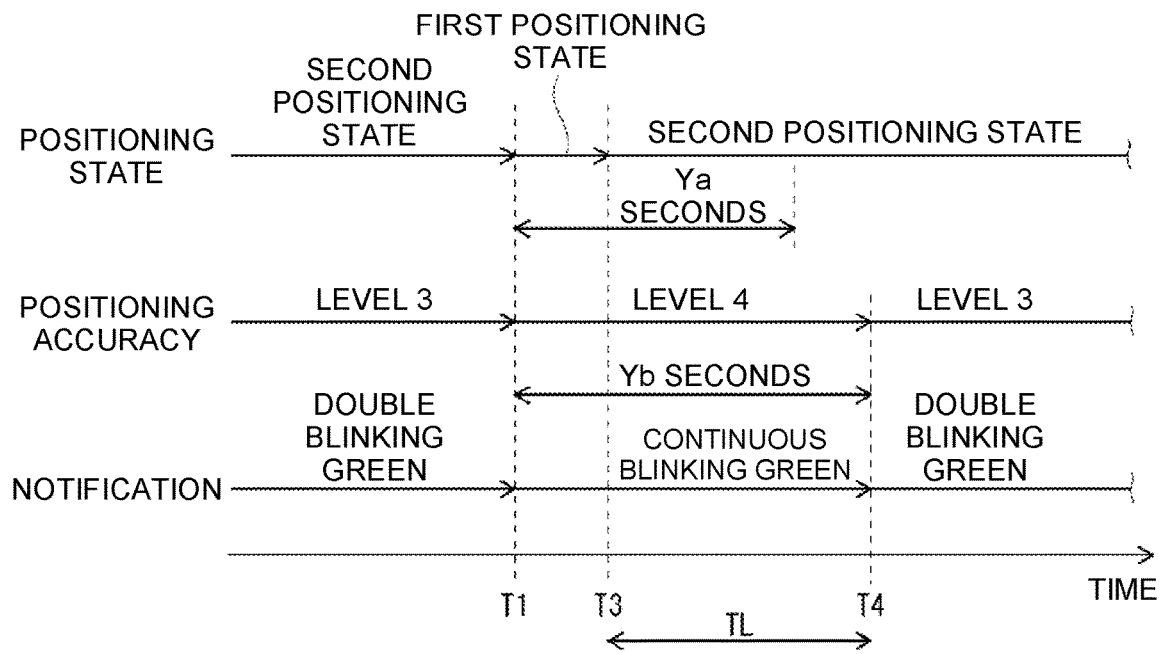
FIG. 7E is a diagram illustrating a modified example of the timing of changing notifications.

In the present embodiment, the second predetermined time (Yb seconds) is set to the same length of time as the first predetermined time (Ya seconds), but the present invention is not limited thereto, and the predetermined times may be set to different lengths. Therefore, as illustrated in FIG. 7E, it is possible to set Yb seconds to a length longer than Ya seconds. In such a case, the first notification "continuous blinking green" is continued for Yb seconds even after Ya seconds elapse, that is, it is continued longer than in the case of FIG. 7B.

Figure 7F:
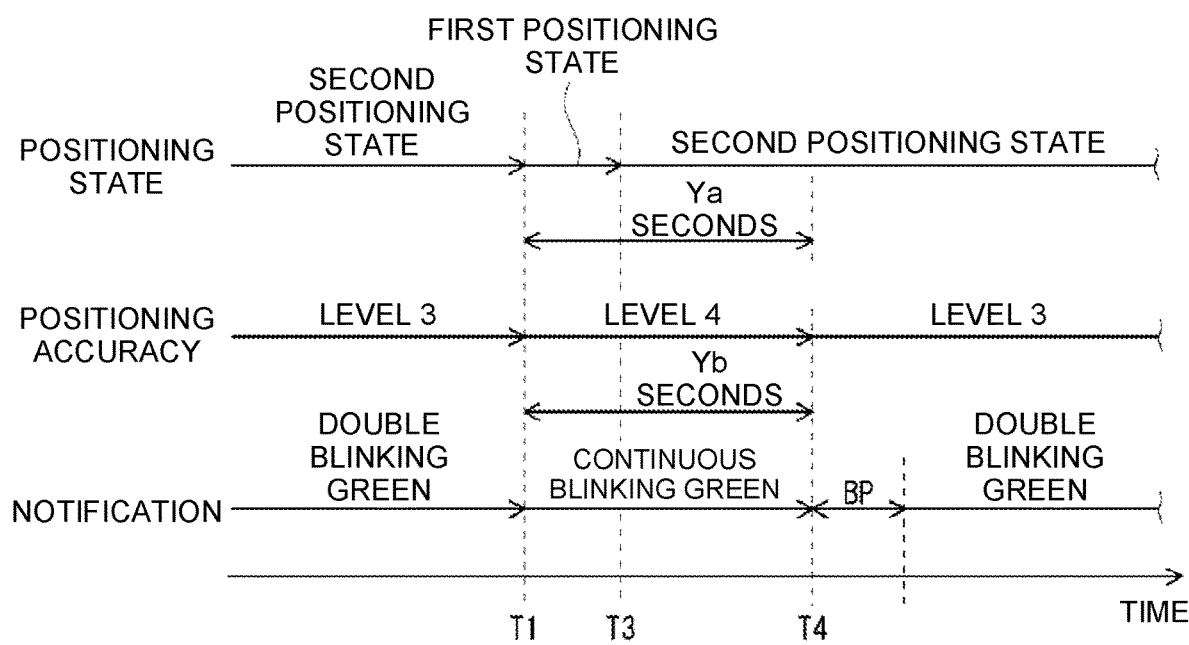
FIG. 7F is a diagram illustrating a modified example of the timing of changing notifications.

In the present embodiment, after the first notification "continuous blinking green" is ended after the second predetermined time (Yb seconds) has elapsed, the second notification "double blinking green" is executed without a time interval. However, the present invention is not limited thereto, and the second notification may be executed after a time interval. Therefore, as illustrated in FIG. 7F, after the "continuous blinking green" has ended after Yb seconds, it is possible to execute the "double blinking green" after a blank period BP in which the notification is not executed. The blank period BP is set to, for example, several seconds or shorter.

Figure 8:
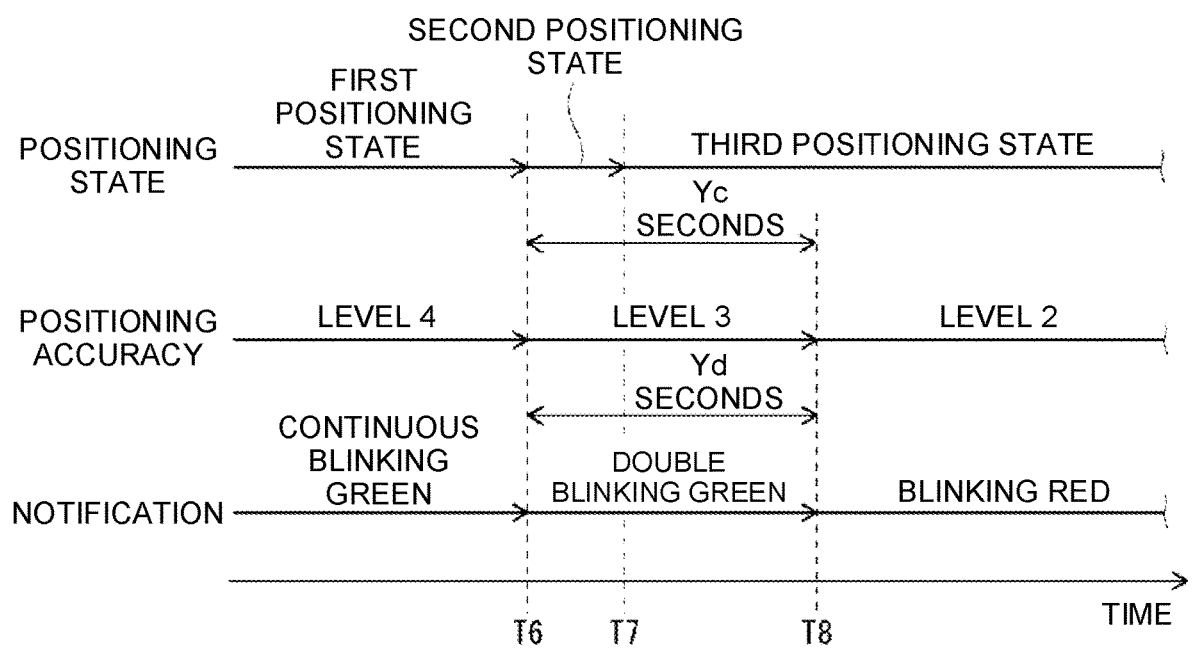
FIG. 8 is a diagram illustrating the timing of changing notifications.

When the positioning accuracy is the third accuracy (level 2), the control unit 60 prohibits the start of autonomous travel and permits the continuation of autonomous travel. The notification unit 66 executes the "blinking red" (third notification) indicating that the positioning accuracy is the third accuracy in response to the control by the control unit 60. As illustrated in FIG. 8, when the rice transplanter 1 satisfies the condition for transitioning the positioning accuracy from the second accuracy to the third accuracy within a third predetermined time or Yc seconds from time T6 after the "double blinking green" (second notification) has been executed in response to a transition to the second accuracy, specifically, when the positioning state is changed from the second positioning state to the third positioning state, the "double blinking green" is continuously executed for Yd seconds, which corresponds to a fourth predetermined time, ends the "double blinking green" after Yd seconds, and then executes the "blinking red". The timing of the time T7 at which the positioning state is changed differs from the timing of the time T8 at which the notification is changed. In this way, the handling of the notification for the third accuracy is made the same as that for the highly accurate positioning accuracy (first accuracy and second accuracy). The matters already described for the first predetermined time (Ya seconds) and the second predetermined time (Yb seconds) can also be applied to the third predetermined time (Yc seconds) and the fourth predetermined time (Yd seconds), respectively.

When the positioning accuracy is the fourth accuracy (level 1), the control unit 60 prohibits the start and continuation of autonomous travel. The notification unit 66 executes the "lighted red" (fourth notification) indicating that the positioning accuracy is the fourth accuracy in response to the control by the control unit 60. When the condition of the positioning accuracy transitioning to the fourth accuracy is satisfied, that is, when the positioning state transitions to the SGPS state and continues for more than X seconds, the rice transplanter 1 immediately executes "lighted red". In the case of level 1, the fourth notification is immediately executed because an emergency stop is involved. In this way, the operator can be notified without delay that the cause of the end of autonomous travel is the deterioration of the positioning state.

Function of Light Emitting Part of Operation Member

The function of the light emitting part 55 provided around the AUTO button 51 will now be described. The light emitting part 55 informs the operator of various situations related to autonomous travel through its light color and lighting pattern in response to the control by the control unit 60. The operation member 50 contains multiple light emitting elements 55L arrayed along the light emitting part 55 (see FIG. 4). In the present embodiment, two light emitting elements 55L disposed in each quadrant, i.e., a total of eight light emitting elements 55L is used, but the present invention is not limited thereto. The light emitting elements 55L are, for example, LEDs.

As illustrated in FIG. 9, the light color and lighting pattern of the light emitting part 55 can be changed in accordance with various situations such as during autonomous travel, during preparation for autonomous travel, completion of preparation for autonomous travel, and when an abnormality occurs. FIG. 9A illustrates a display for autonomous travel, in which the entire light emitting part 55 is lighted in green or a first light color and blinks at a constant cycle. FIG. 9B illustrates a display for preparation for the start of autonomous travel, in which the entire light emitting part 55 is lighted in green and blinks for a different number of times and different tempo from those in FIG. 9A. Depending on the number of blinks and the pattern, the operator can be instructed to perform operations such as A point registration. FIG. 9C to 9I1 also illustrate displays for preparation for the start of autonomous travel, in which the light emitting part 55 is lighted in green.

Figure 9A:
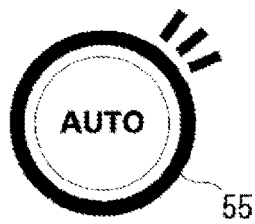
FIG. 9 is a diagram illustrating examples of lighting patterns of a light emitting part of an operation member.
Figure 9F:
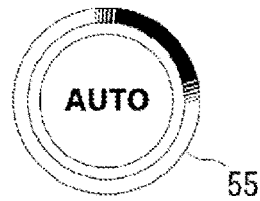
Figure 9B:
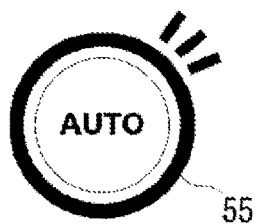
Figure 9G:
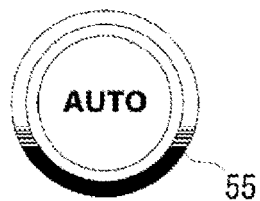
Figure 9C:
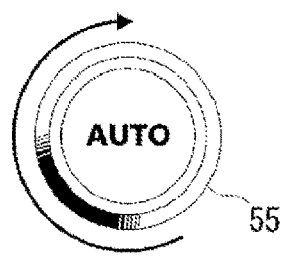
Figure 9H:
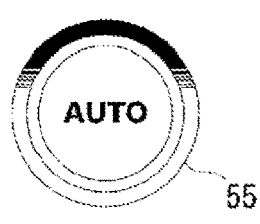
Figure 9D:
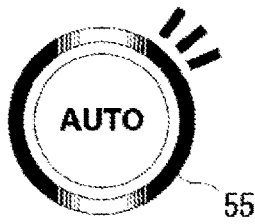

Before or after engine start, a section of the light emitting part 55 is lighted as illustrated in FIG. 9C, and the lighted section rotates. When the work vehicle is tilted to the left or right, the operator is informed by the blinking of the light emitting part 55 on the left and right sides, as illustrated in FIG. 9D. Similarly, when the work vehicle is tilted to the back or front, the light emitting part 55 blinks at the up and down sides, as illustrated in FIG. 9E. When the front-rear direction of the work vehicle is tilted relative to the target route and there is a deviation to the right (when it is necessary to turn the steering handle 32 to the right), the upper right side of the light emitting part 55 is lighted as in FIG. 9F to provide guidance. Similarly, when reverse movement is required, the lower section of the light emitting part 55 is lighted as in FIG. 9G, and when there is no deviation, the upper section of the light emitting part 55 is lighted as in FIG. 9H, to provide guidance.

Figure 9I:
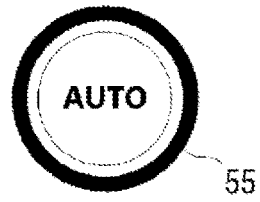
Figure 9E:
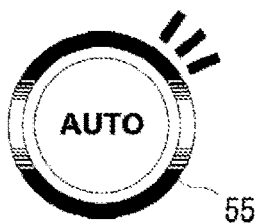
Figure 9J:
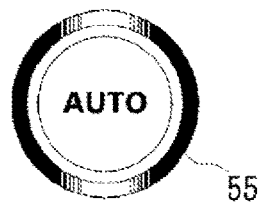

FIG. 9I illustrates a display for the completion of preparation for the start of autonomous travel, in which the entire light emitting part 55 is lighted in green. FIG. 9J illustrates a display for when an abnormality occurs, in which the light emitting part 55 is lighted in red or a second light color. In the illustrated example, the left and right sides of the light emitting part 55 are lighted, but the lighted sites can be changed in accordance with the location of the abnormality. For example, when the positioning antenna 43a fails, the upper right side of the light emitting part 55 may be lighted in red, and when the power steering fails, the lower left side of the light emitting part 55 may be lighted in red.

Control Structured Related to Autonomous Travel

Figure 10:
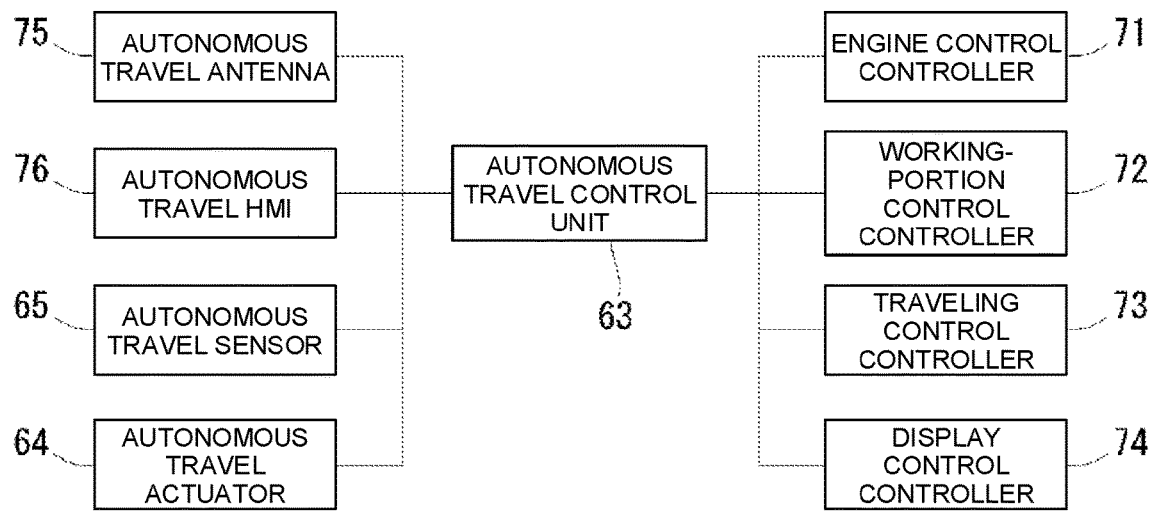
FIG. 10 is a block diagram illustrating an example of a control structure related to autonomous travel.

An example of the control structure related to autonomous travel will now be described. As illustrated in FIG. 10, the autonomous travel control unit 63 (autonomous travel controller) is connected to other control controllers, acquires information from the other control controllers, and performs control necessary for autonomous travel. The other control controllers include an engine control controller 71 that controls the operation of the engine 7, a working-portion control controller 72 that controls the operation of the planting portion 20, a traveling control controller 73 that controls the operation of the traveling portion 10, a display control controller 74 that controls the display device 34, and the like. The control necessary for autonomous travel includes control of an autonomous travel antenna 75 (positioning unit 43), an autonomous travel HMI (human machine interface) 76, and an autonomous travel actuator 64.

When an abnormality is detected in any part of the rice transplanter 1 during autonomous travel, the autonomous travel control unit 63 can stop the autonomous travel on basis of the error information (failure information) acquired from another control controller. In such a case, the autonomous travel control unit 63 needs to determine whether or not the autonomous travel will be affected on the basis of the content of the acquired error information, and then, on the basis of the determination, needs to determine whether or not to stop the autonomous travel. Therefore, the autonomous travel control unit 63 is required to have a high processing capacity, and a controller having a low processing capacity cannot be applied thereto. This causes the control structure to be complicated.

Figure 11:
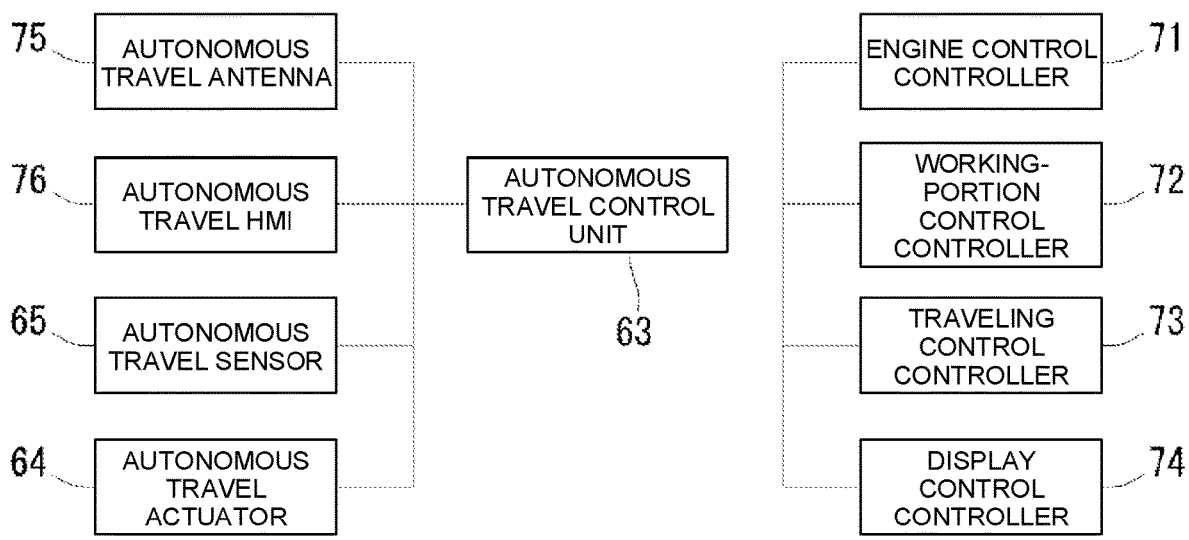
FIG. 11 is a block diagram illustrating a modified example of a control structure related to autonomous travel.

On the other hand, as illustrated in FIG. 11, the autonomous travel control unit 63 may be structurally separated from the other control controllers. In such a case, the autonomous travel control unit 63 can individually execute necessary control independently of the error information possessed by the other control controllers. Therefore, even if an abnormality that does not affect the autonomous travel, for example, a failure of the display device 34 occurs, the control can be performed without disturbing the autonomous travel. Since the autonomous travel control unit 63 does not require a high processing capacity and controller having low processing capacity can be applied thereto, it becomes easy to construct a control structure. In FIG. 11, the autonomous travel control unit 63 is not connected to any of the other control controllers, but, for example, it is possible to connect the autonomous travel control unit 63 to any one of the controllers and not to the remaining three.

The present invention is not limited to the aforementioned embodiment, and various improvements and modifications can be made without departing from the spirit of the present invention.

DESCRIPTION OF REFERENCE NUMERALS 1 rice transplanter (example of work vehicle)
14 driver's seat
32 steering handle
35 arm member
43 positioning unit (positioning portion)
50 operation member
51 AUTO button (indicator)
52 display lamp (display)
60 control unit
66 notification unit

The invention claimed is:

1. A work vehicle that autonomously travels while specifying a position of the work vehicle by using a satellite positioning system, the work vehicle comprising:
   a positioning portion that receives a positioning signal from the satellite positioning system and measures the position of the work vehicle based on the positioning signal;
   a control unit that determines a positioning accuracy based on a positioning state of the positioning portion, and permits the autonomous travel when the positioning accuracy is higher than or equal to predetermined accuracy; and
   a notification unit that executes a first notification and a second notification in response to control by the control unit, the first notification indicating that the positioning accuracy is a first accuracy higher than or equal to the predetermined accuracy, the second notification indicating that the positioning accuracy is a second accuracy higher than or equal to the predetermined accuracy,
   wherein when a condition for transitioning the positioning accuracy from the first accuracy to the second accuracy is satisfied within a first predetermined time after the first notification is executed in response to a transition to the first accuracy, the first notification is continuously executed for a second predetermined time, and the first notification is ended and the second notification is executed after the second predetermined time elapses.

2. The work vehicle according to claim 1, wherein,
   the control unit permits continuation of the autonomous travel while prohibiting start of the autonomous travel when the positioning accuracy is a third accuracy lower than the first accuracy and the second accuracy, the notification unit executes a third notification indicating that the positioning accuracy is the third accuracy in response to control by the control unit, and when a condition for transitioning the positioning accuracy from the second accuracy to the third accuracy is satisfied within a third predetermined time after executing the second notification in response to the transition to the second accuracy, the second notification is continuously executed for a fourth predetermined time, and the second notification is ended and the third notification is executed after the fourth predetermined time elapses.

3. The work vehicle according to claim 1, wherein, the control unit prohibits the start and the continuation of the autonomous travel when the positioning accuracy is a fourth accuracy lower than the first accuracy and the second accuracy, the notification unit executes a fourth notification indicating that the positioning accuracy is the fourth accuracy in response to control by the control unit, and when a condition for transitioning the positioning accuracy to the fourth accuracy is satisfied, the fourth notification is immediately executed.

4. The work vehicle according to claim 1, further comprising:

a steering handle disposed in front of a driver's seat; an indicator that instructs start of the autonomous travel;

an operation member including a display of the notification unit; and an arm member that supports the operation member, wherein the operation member supported by the arm member is movable within a range from a front edge to a rear edge of the steering handle in a plan view but is not movable behind the rear edge of the steering handle in a plan view.

* * * * *